(12) United States Patent
Fewless et al.

(10) Patent No.: US 12,025,635 B2
(45) Date of Patent: Jul. 2, 2024

(54) CALIBRATABLE PEDESTRIAN PRESSURE PROBE WITH SELF-ALIGNING COLLAR

(71) Applicant: CPP Incorporated, Windsor, CO (US)

(72) Inventors: Yarrow J. Fewless, Fort Collins, CO (US); Roy O. Denoon, Fort Collins, CO (US); David Banks, Durango, CO (US); John A. Summers, Berthoud, CO (US)

(73) Assignee: CPP Incorporated, Windsor, CO (US)

( * ) Notice: Subject to any disclaimer, the term of this patent is extended or adjusted under 35 U.S.C. 154(b) by 214 days.

(21) Appl. No.: 17/144,251

(22) Filed: Jan. 8, 2021

(65) Prior Publication Data

US 2022/0221484 A1    Jul. 14, 2022

(51) Int. Cl.
*G01P 5/14*    (2006.01)
*G01F 1/42*    (2006.01)

(52) U.S. Cl.
CPC ............. *G01P 5/14* (2013.01); *G01F 1/42* (2013.01)

(58) Field of Classification Search
CPC .................................... G01P 5/14; G01F 1/42
USPC ................................................... 73/37.5
See application file for complete search history.

(56) References Cited

U.S. PATENT DOCUMENTS

| | | | |
|---|---|---|---|
| 4,833,917 A * | 5/1989 | Wilson | G01P 5/165 73/182 |
| 5,948,989 A * | 9/1999 | Ichikawa | G01L 19/0092 73/717 |
| 7,392,710 B1 * | 7/2008 | Ben-Mansour | G01F 1/206 73/866.5 |
| 8,730,319 B2 | 5/2014 | Sekine et al. | |
| 9,437,170 B1 | 9/2016 | Quevedo Montesdeoca | |
| 9,714,089 B1 | 7/2017 | Louw et al. | |
| 10,656,171 B1 * | 5/2020 | Pleiman | G01P 13/025 |
| 2005/0274178 A1 | 12/2005 | Shin | |

(Continued)

FOREIGN PATENT DOCUMENTS

| | | |
|---|---|---|
| CN | 105184423 A | 12/2015 |
| CN | 106096110 A | 11/2016 |

(Continued)

OTHER PUBLICATIONS

Mean pressure distributions around a circular cylinder in the branch of a T-junction with/without vanes; WU et al (Year: 2014).*

(Continued)

*Primary Examiner* — Alexander A Mercado
*Assistant Examiner* — Rodney T Frank
(74) *Attorney, Agent, or Firm* — Craig R. Miles; CR MILES P.C.

(57) ABSTRACT

A pressure probe affixable in a scale three-dimensional model of direct environment, buildings, and other objects and having a plurality of orifices open in circumferential spaced apart relation on a probe side surface each connected through a dynamic pressure flow path to a plurality of pressure sensors each of which generates a pressure signal which varies based on change dynamic pressure at a corresponding one of the plurality of orifices which pressure signals can be analyzed to determine fluid flow direction and fluid flow speed of a fluid flow about the pressure probe affixed in the scale three-dimensional model.

9 Claims, 13 Drawing Sheets
(2 of 13 Drawing Sheet(s) Filed in Color)

(56) References Cited

U.S. PATENT DOCUMENTS

| | | | |
|---|---|---|---|
| 2007/0107510 A1 | 5/2007 | Agami et al. | |
| 2010/0265125 A1 | 10/2010 | Kelly et al. | |
| 2010/0313674 A1* | 12/2010 | Dutel | G01F 1/661 356/338 |
| 2014/0331750 A1* | 11/2014 | Vander Hoek | G01F 1/34 219/76.1 |
| 2015/0042479 A1 | 2/2015 | Muetzel et al. | |
| 2015/0142393 A1 | 5/2015 | van den Berghe | |
| 2016/0258974 A1 | 9/2016 | Golovkin et al. | |
| 2020/0240558 A1* | 7/2020 | Genev | F16L 5/10 |
| 2021/0116474 A1* | 4/2021 | Anderson | G01P 5/165 |

FOREIGN PATENT DOCUMENTS

| | | |
|---|---|---|
| CN | 104699936 B | 5/2018 |
| CN | 105513133 | 5/2018 |
| JP | 2002049298 | 2/2002 |
| JP | 5685499 | 3/2015 |

OTHER PUBLICATIONS

PCT International Patent Application No. PCT/US21/65566, International Search Report and Written Opinion of the International Searching Authority dated Mar. 29, 2022, 16 pages.
Banks et al. Practical issues for pedestrian wind comfort prediction: surface-level wind speed sensors. Feb. 2006, 12th Australian Wind Engineering Society Workshop, Queenstown, New Zealand, 4 pages.
Banks et al. Practical issues for pedestrian wind comfort prediction: comfort criteria. Feb. 2006, 12th Australian Wind Engineering Society Workshop, Queenstown, New Zealand, 4 pages.
PCT International Patent Application No. PCT/US18/43768, International Search Report and Written Opinion of the International Searching Authority dated Oct. 3, 2018, 9 pages.
PCT International Patent Application No. PCT/US19/13862, International Search Report and Written Opinion of the International Searching Authority dated Apr. 9, 2019, 15 pages.
U.S. Appl. No. 15/916,593, filed Mar. 9, 2018.
U.S. Appl. No. 15/916,593, Office Action mailed Sep. 16, 2020.
U.S. Appl. No. 16/041,592, filed Jul. 20, 2018.
U.S. Appl. No. 16/041,592, Office Action mailed Dec. 6, 2021.
European Patent Application No. 18926772.7, European Search Report dated Mar. 17, 2022, 12 pages.

* cited by examiner

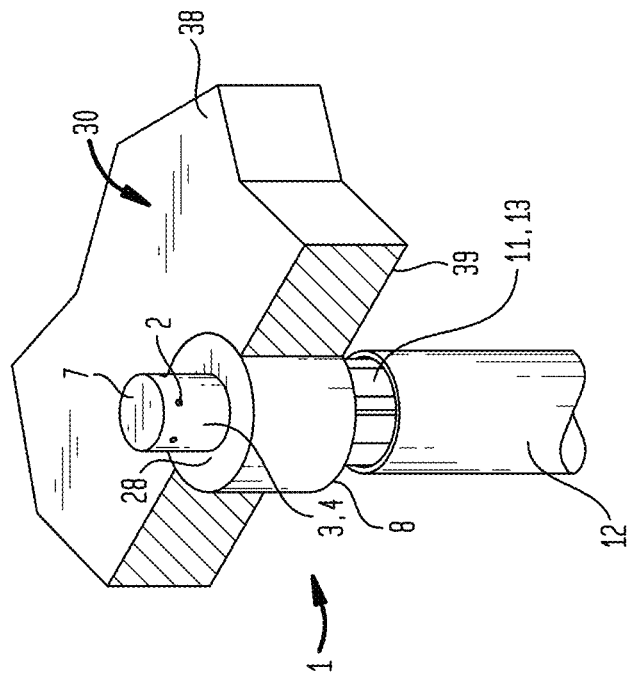
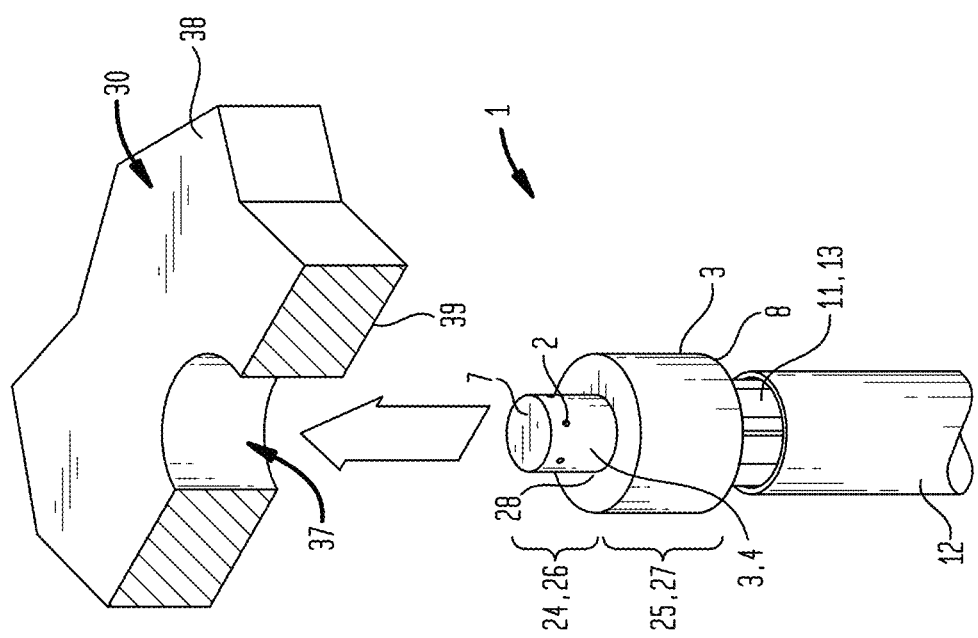
FIG. 1A
FIG. 1B

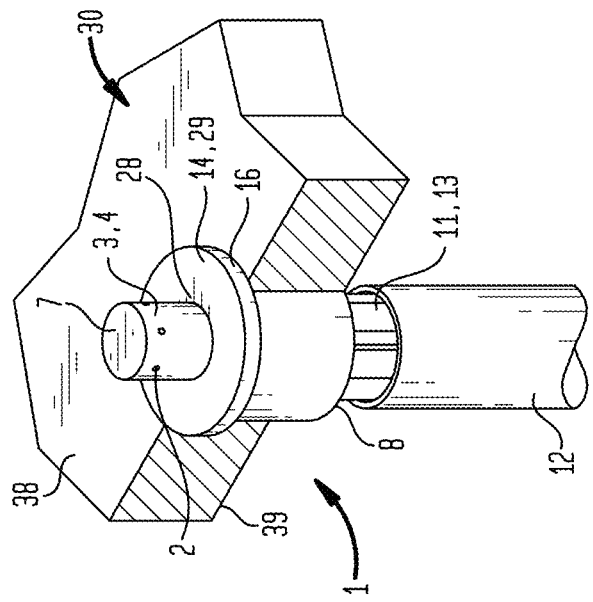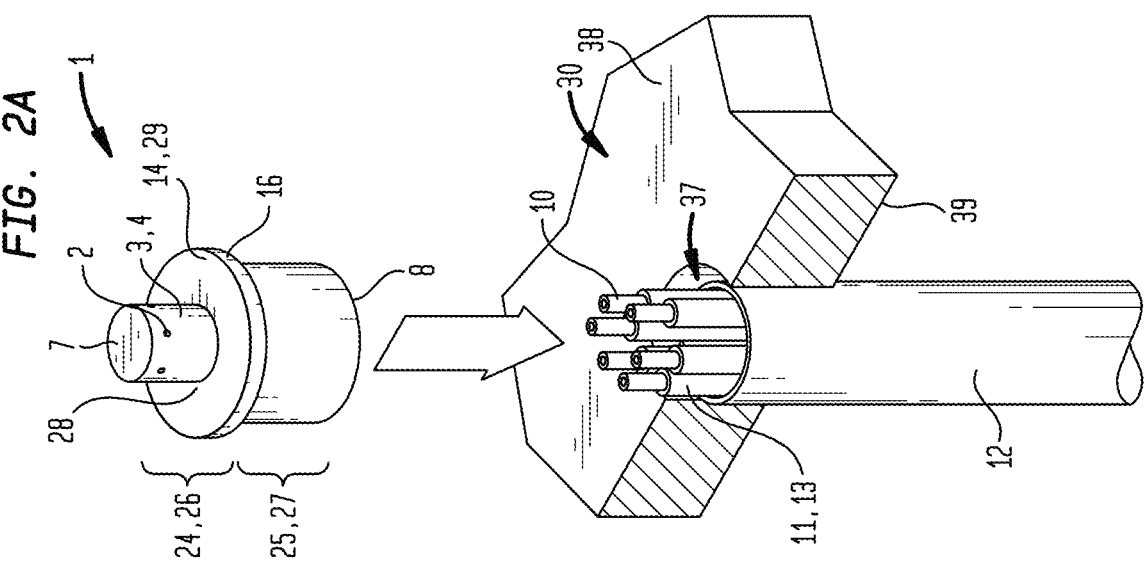

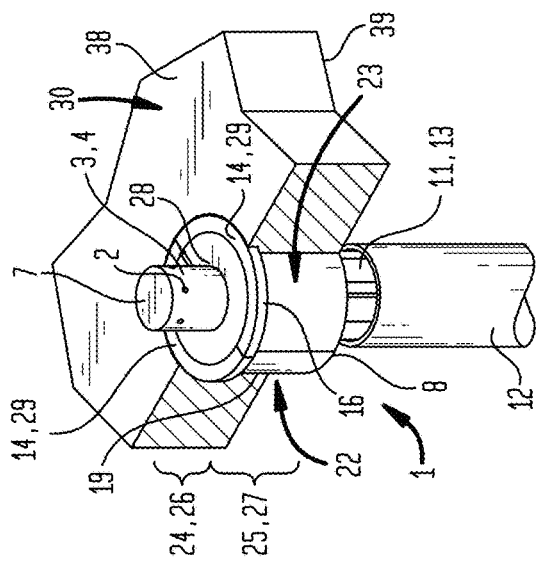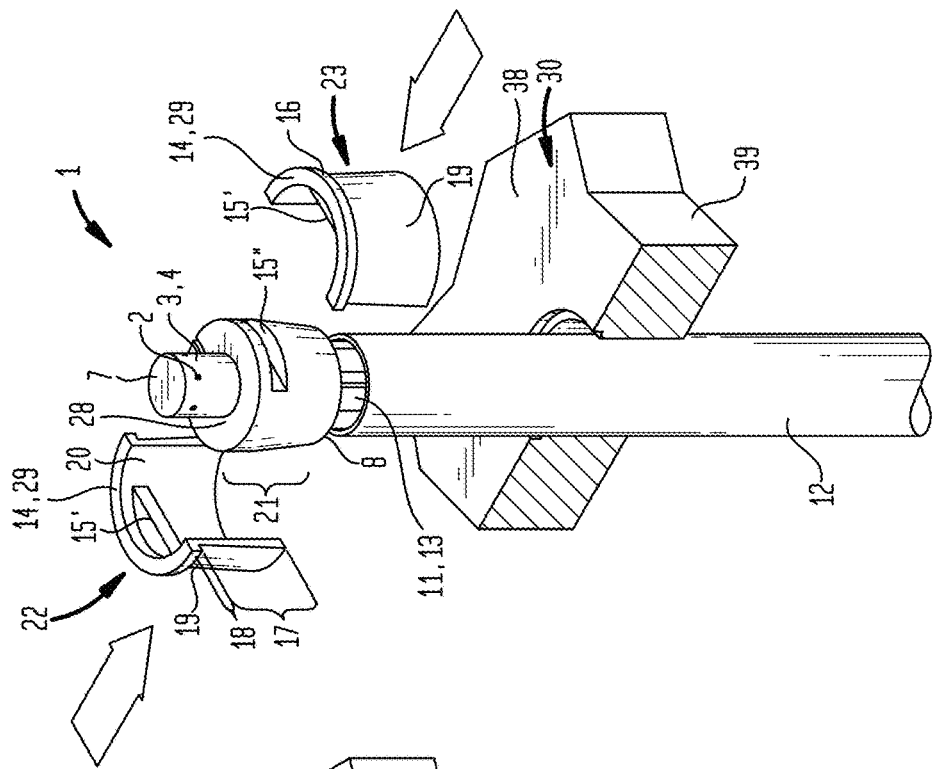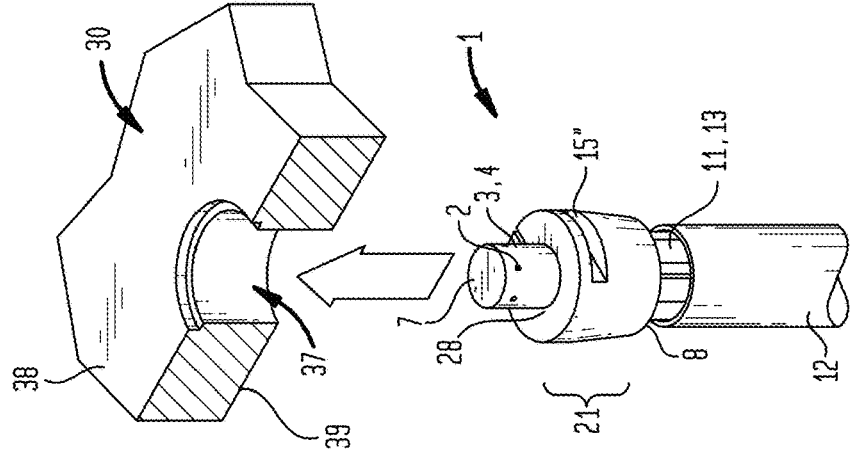

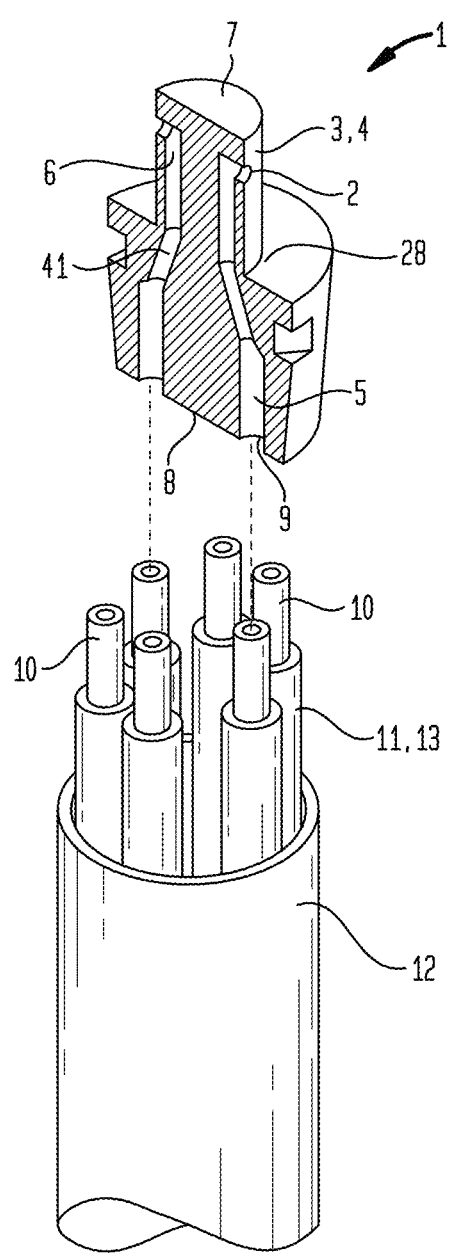
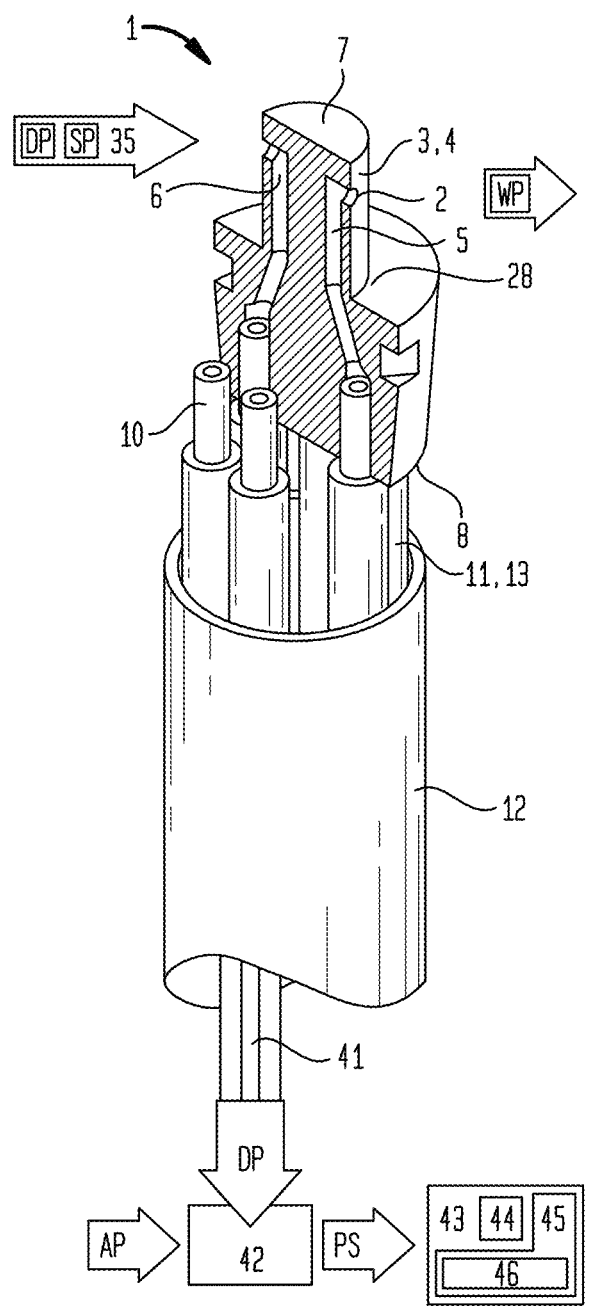
FIG. 3D
FIG. 3E

CALIBRATABLE PEDESTRIAN PRESSURE PROBE WITH SELF-ALIGNING COLLAR

I. FIELD OF THE INVENTION

A pressure probe affixable in a scale three-dimensional model of direct environment, buildings, and other objects and having a plurality of orifices open in circumferential spaced apart relation on a probe side surface each connected through a dynamic pressure flow path to a plurality of pressure sensors each of which generates a pressure sensor signal which varies based on change in dynamic pressure at a corresponding one of the plurality of orifices which pressure sensor signals can be analyzed to determine fluid flow direction and fluid flow speed of a fluid flow about the pressure probe affixed in the scale three-dimensional model.

II. SUMMARY OF THE INVENTION

A broad object of particular embodiments of the invention can be to provide a probe including a probe side surface disposed between a probe first end and a probe second end having a plurality of orifices open in circumferential spaced apart relation on the probe side surface and a plurality of exit orifices open on a probe surface fluidically coupled by a plurality of channels in the probe which can by corresponding tubular structures be fluidically coupled to one or more pressure sensors.

Another broad object of particular embodiments of the invention can be to provide a probe including a probe side surface disposed between a probe first end and a probe second end having a plurality of orifices open in circumferential spaced apart relation on the probe side surface and a flange outwardly extending from the probe side surface to a flange perimeter adapted to seat on a scale three-dimensional model to dispose the plurality of orifices a distance above the scale three-dimensional model with the plurality of orifices fluidically coupled by a plurality of channels in the probe to a plurality of exit orifices which can by corresponding tubular structures be fluidically coupled to one or more pressure sensors.

Another broad object of particular embodiments of the invention can be to provide a probe including a probe side surface disposed between a probe first end and a probe second end having a plurality of orifices open in circumferential spaced apart relation on the probe side surface and an installable and removable flange having a flange coupling structure including a first portion of the flange coupling structure coupled to the flange and a second portion of the flange coupling structure coupled to the probe side surface each adapted to mateably couple the flange to the probe side surface and extend from the probe side surface to a flange perimeter, the flange adapted to seat on a scale three-dimensional model to dispose the plurality of orifices a distance above the scale three-dimensional model with the plurality of orifices fluidically coupled by a plurality of channels in the probe to a plurality of exit orifices which can by corresponding tubular structures be fluidically coupled to one or more pressure sensors.

Another broad object of the invention can be to provide a method of installing a probe in a scale three-dimensional model comprising connecting a plurality of tubular structures to a corresponding plurality of channels in the probe which open in a plurality of orifices disposed in circumferential spaced apart relation on a probe side surface of the probe and inserting the probe in a through bore communicating between a model bottom surface and a model top surface of the three-dimensional model and locating the probe side surface in the through bore with the plurality of orifices disposed a distance above the model top surface.

Another broad object of the invention can be to provide a method of installing a probe in a scale three-dimensional model comprising passing a plurality of tubular structures through a through bore communicating between a model bottom surface and a model top surface of a scale three-dimensional model and connecting the plurality of tubular structures to a corresponding plurality of channels in said probe which open in a plurality of orifices disposed in circumferential spaced apart relation on a probe side surface of the probe and inserting the probe in the through bore in the scale three-dimensional model, and seating a flange outwardly extending from the probe side surface on the model top surface to dispose the plurality of orifices a distance above the model top surface.

Another broad object of the invention can be to provide a method of installing a probe in a scale three-dimensional model comprising connecting a plurality of tubular structures to a corresponding plurality of channels in the probe which open in a plurality of orifices disposed in circumferential spaced apart relation on a probe side surface of the probe and passing the probe connected to the plurality of tubular structures through a through bore communicating between a model bottom surface and a model top surface of the three-dimensional model, and installing a flange on a portion of the probe side surface which outwardly extends from said probe side surface to a flange perimeter, and inserting the probe in the through bore in the scale three-dimensional model, and seating the flange on the model top surface of the three-dimensional model disposing the plurality of orifices a distance above the model top surface.

Another broad object of embodiments of the invention can be to provide a method of affixing a pressure probe in a scale three-dimensional model of direct environment, buildings, and other objects to dispose a plurality of orifices open in circumferential spaced apart relation on a probe side surface of the pressure probe a distance above the scale three-dimensional model with each of the plurality of orifices connected through a dynamic pressure flow path to one or more pressure sensors each generating a pressure sensor signal which varies based on change in dynamic pressure at a corresponding one of the plurality of orifices and which can be analyzed to determine fluid flow direction and fluid flow speed of an fluid flow about the pressure probe affixed in the scale three-dimensional model.

Naturally, further objects of the invention are disclosed throughout other areas of the specification, drawings, photographs, and claims.

III. BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is an illustration of an embodiment of the probe and method of affixing the probe to a three-dimensional model.

FIG. 1B is an illustration of an embodiment of the probe shown in FIG. 1 affixed in the operating orientation in a three-dimensional model.

FIG. 2A is an illustration of an embodiment of a probe and method of affixing the probe to a three-dimensional model.

FIG. 2B is an illustration of an embodiment of the probe shown in FIG. 2 affixed in the operating orientation in a three-dimensional model.

FIG. 3A is an illustration of an embodiment of probe and method of passing the probe through a through bore in a three-dimensional model.

FIG. 3B is an illustration of the embodiment of the probe shown in FIG. 3A and a method of releasably attaching first and second flange components to the probe.

FIG. 3C is an illustration of the embodiment of the probe shown in FIG. 3B affixed in the operating orientation in a three-dimensional model.

FIG. 3D is an exploded cross section view 3D-3D as shown in FIG. 3A.

FIG. 3E is an assembled cross second view 3E-3E as shown in FIG. 3A.

Figure 7:
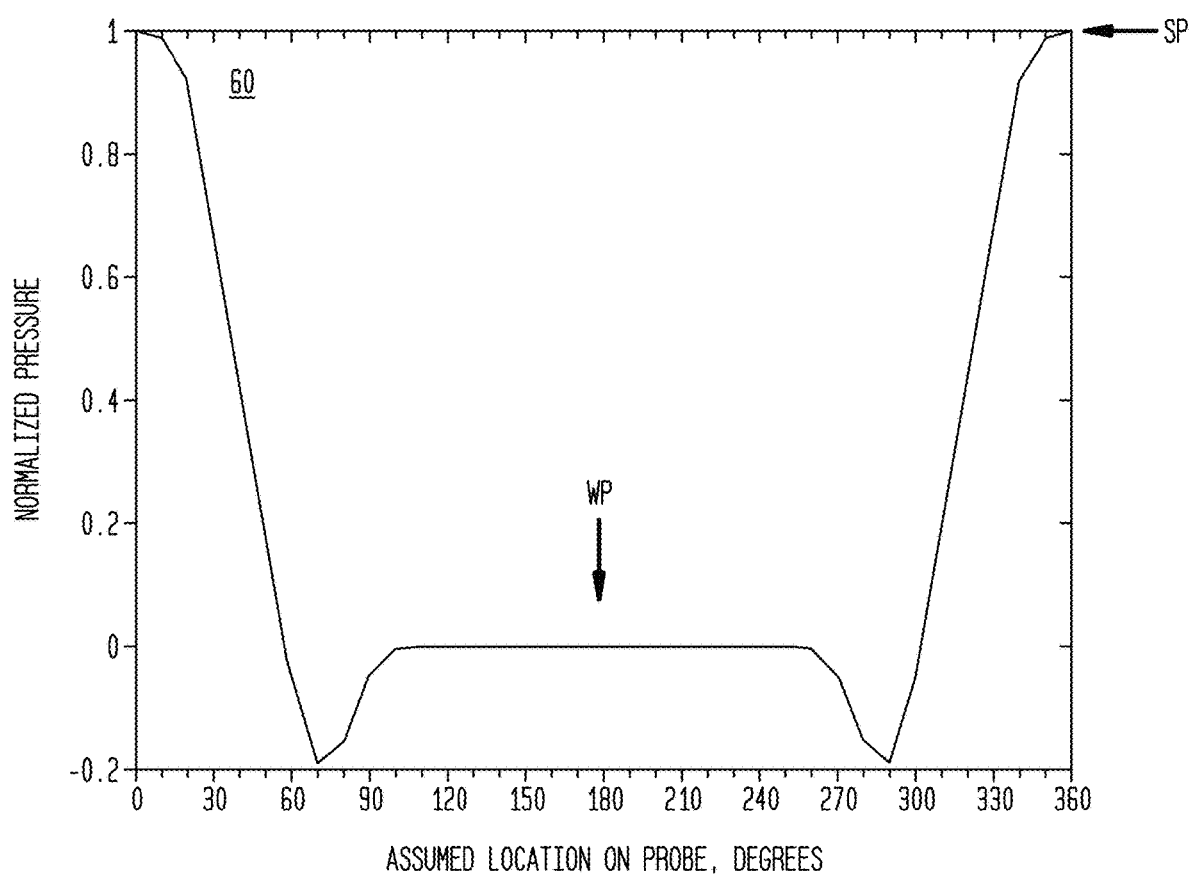
FIG. 7 is a plot of a control pressure pattern generated by probe pressure data analysis of a pressure signal generated by a pressure sensor fluidically coupled by a dynamic pressure pathway to an orifice open on a probe side surface disposed generally orthogonal to a fluid flow applied over a generally flat surface and rotated through 360 degrees.
Figure 8:
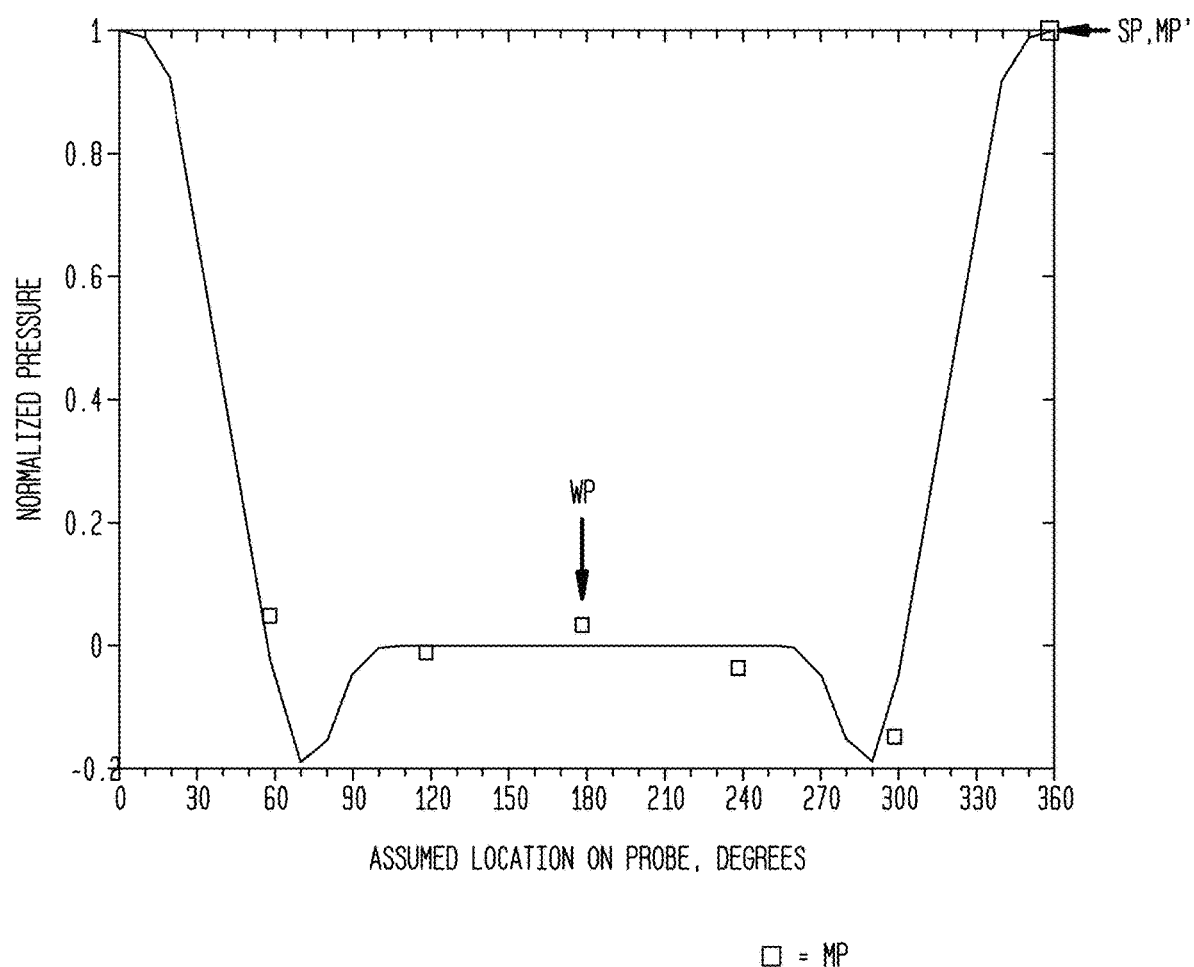

FIG. 8 is plot of the control pressure pattern depicted in FIG. 7 superimposed with measured pressures generated by probe pressure data analysis of pressure signals generated by pressure sensors fluidically coupled by corresponding dynamic pressure pathways to six orifices open on the probe side surface in circumferential equidistance spaced apart relation with the probe side surface disposed generally orthogonal to a fluid flow having the stagnation pressure located directly upwind of one of the six orifices.

Figure 9:
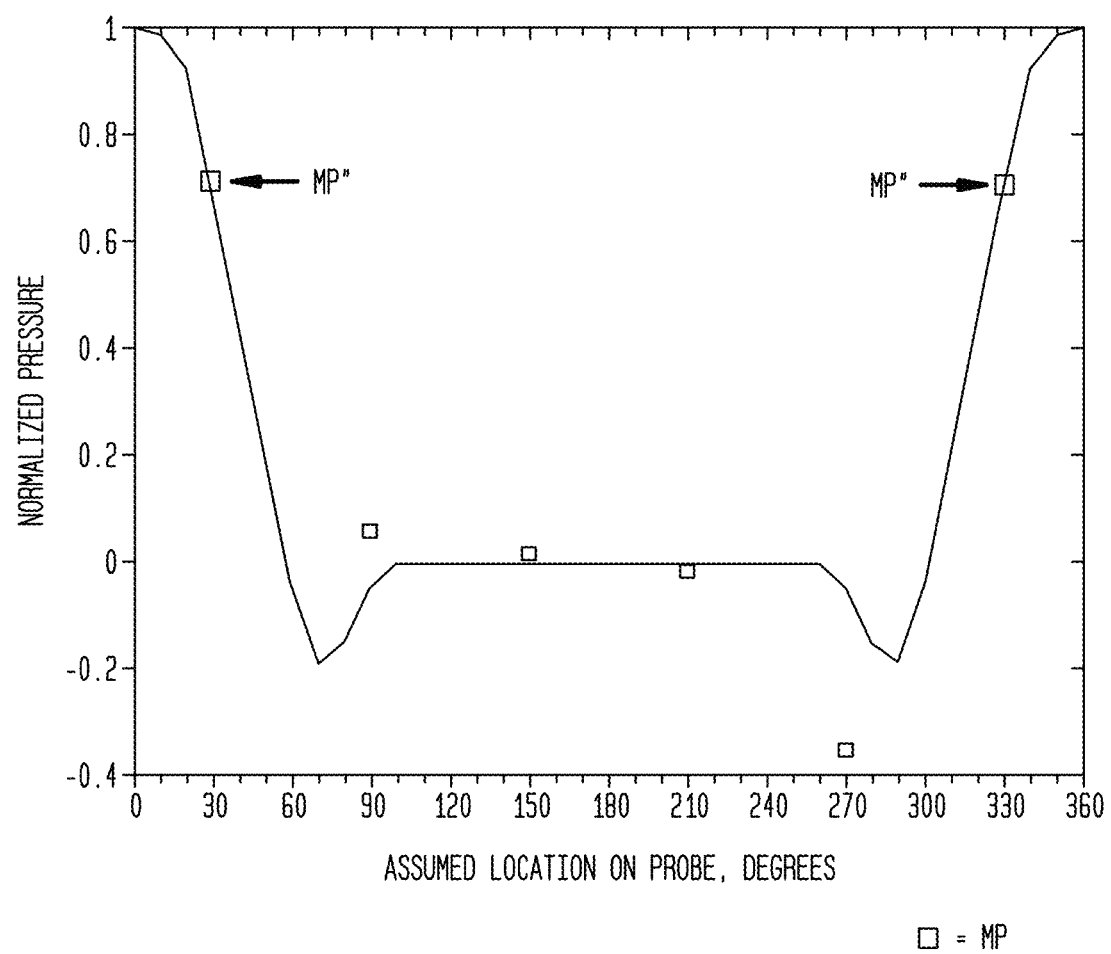

FIG. 9 is plot of the control pressure pattern depicted in FIG. 7 superimposed with measured pressures generated by probe pressure data analysis of pressure signals generated by pressure sensors fluidically coupled by corresponding dynamic pressure pathways to six orifices open on the probe side surface in circumferential equidistance spaced apart relation with the probe side surface disposed generally orthogonal to a fluid flow having the stagnation pressure located between and adjacent pair of the six orifices.

Figure 10:
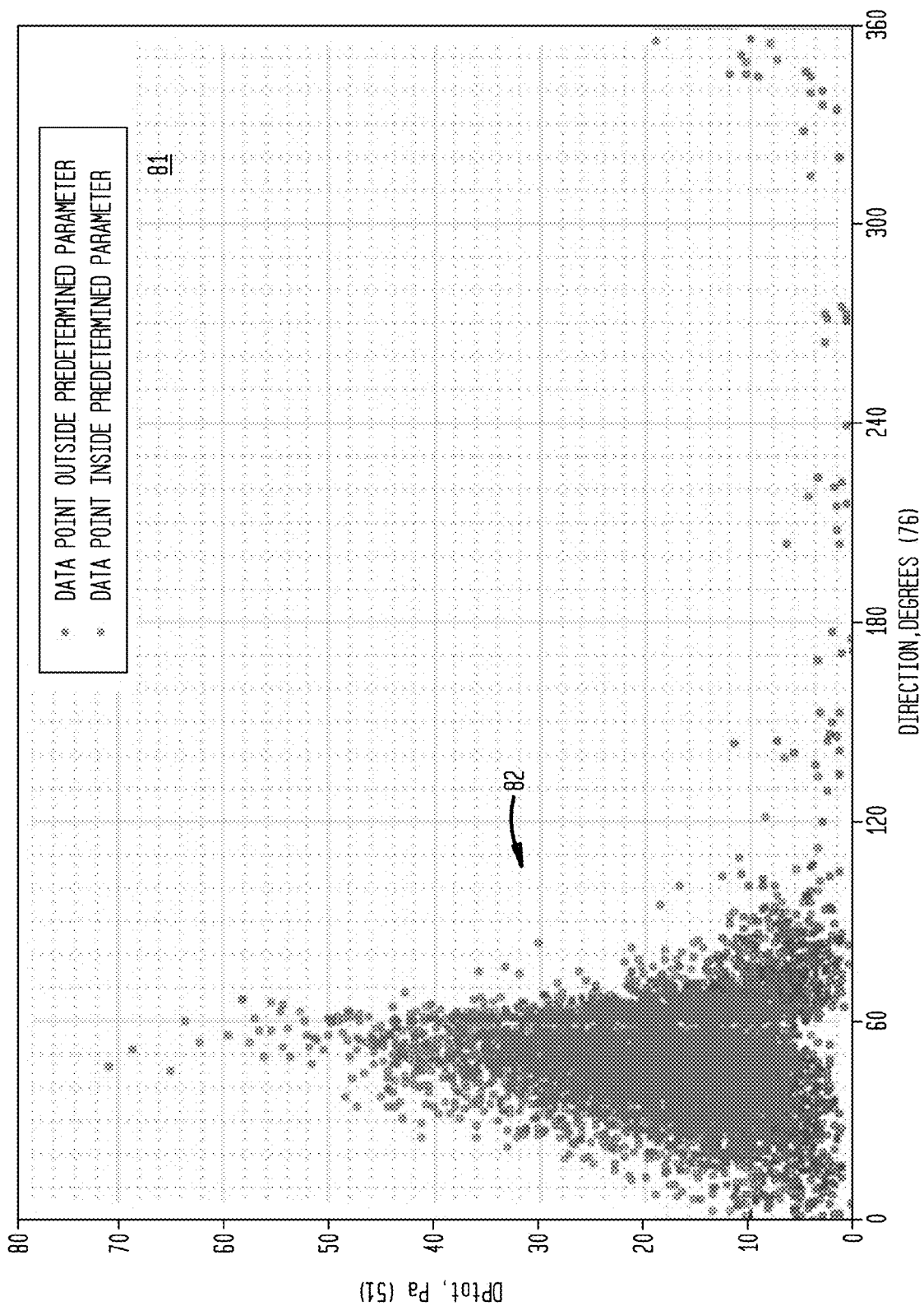

FIG. 10 is a scatter plot of determined pressure time series data plotted against fluid flow direction time series data indicating relatively low directional scatter of the fluid flow.

Figure 11:
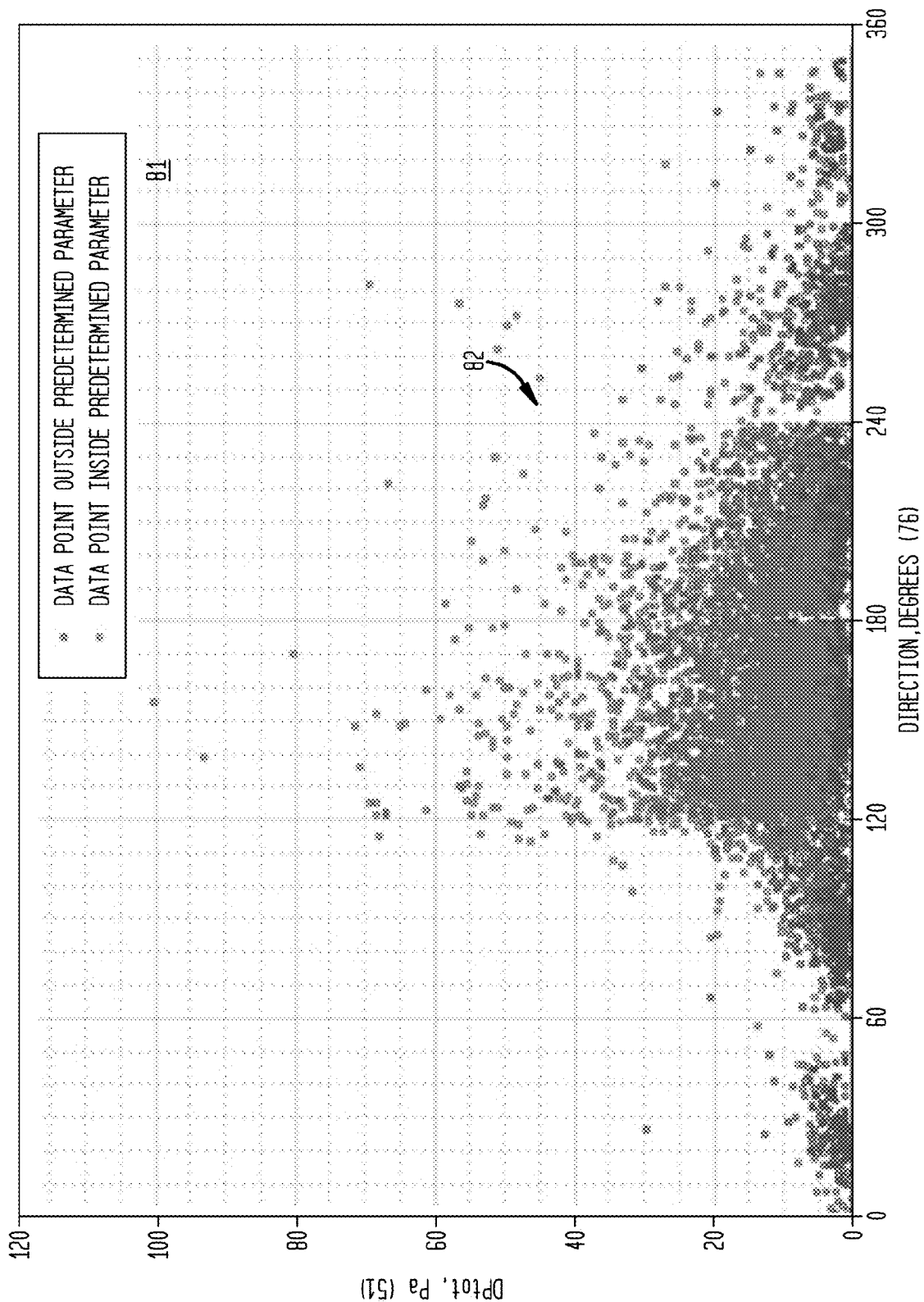

FIG. 11 is a scatter plot of determined pressure time series data plotted against fluid flow direction time series data indicating relatively high directional scatter of the fluid flow.

Figure 12:
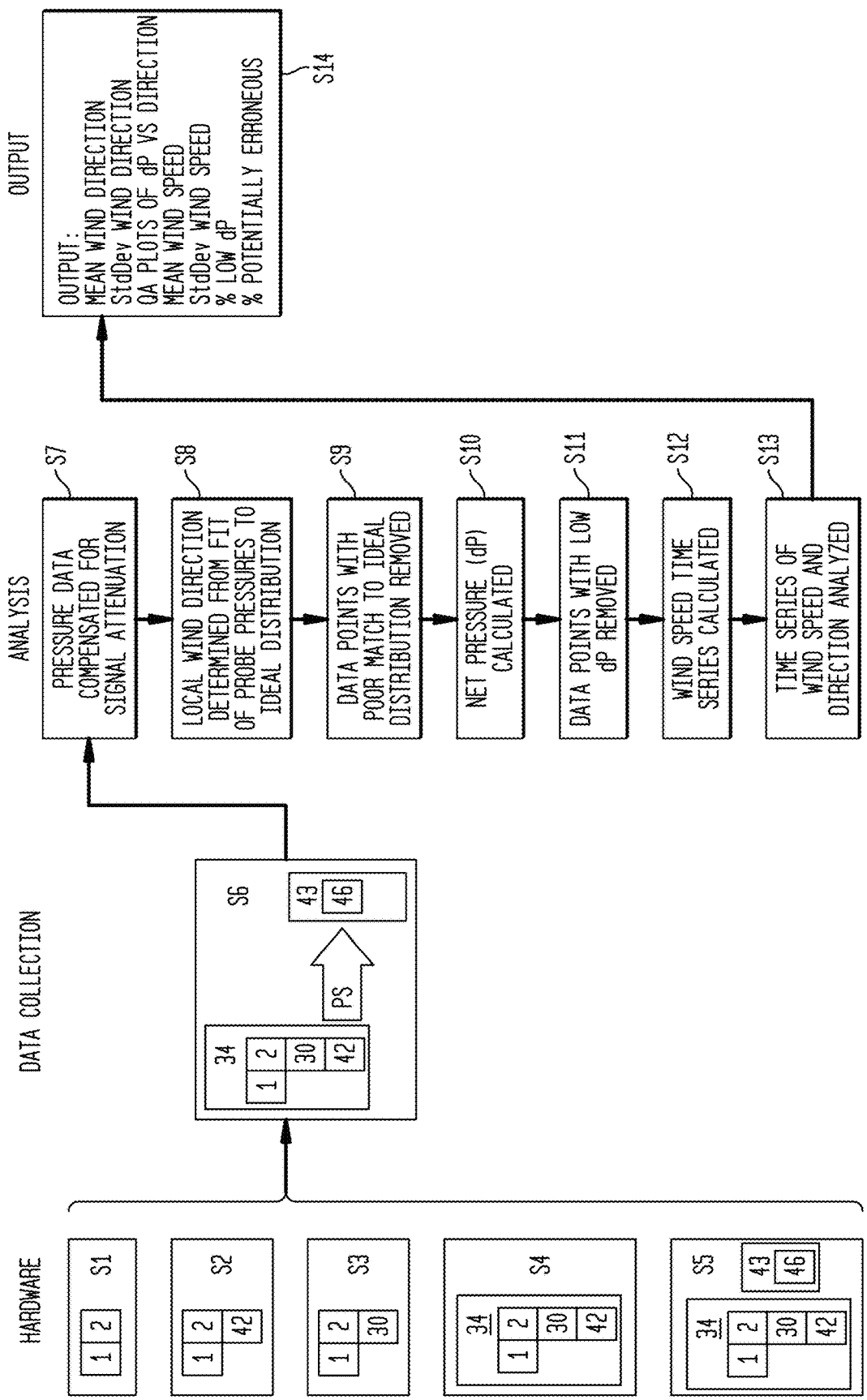

FIG. 12 is a block flow diagram of a method of determining fluid flow direction and fluid flow speed of a fluid flow about the pressure probe affixed in a scale three-dimensional model.

IV. DETAILED DESCRIPTION OF THE INVENTION

Now, with general reference to FIGS. 1A through 3C which depict embodiments of a probe (1) embodying examples of the present invention. The probe (1) includes a plurality of orifices (2) opening through a probe surface (3) of the probe (1). In particular embodiments, the plurality of orifices (2) opening through the probe surface (3) of the probe (1) can include at least two orifices (2, 2', 2", 2'" . . . ). Typically, the plurality of orifices (2) opening through the probe surface (3) of the probe (1) can be between two orifices and ten orifices, or selected from the group consisting of: two orifices, three orifices, four orifices, five orifices, six orifices, seven orifices, eight orifices, nine orifices, and ten orifices. The illustrative examples of the probe (1) include six orifices; however, this is not intended to preclude embodiments having greater or lesser than six orifices. There can be a substantial advantage by inclusion of a greater than lesser number of orifices (2) on the probe surface (3) due to the increased fidelity of physical measurements using a greater number of orifices (2) opening on the probe surface (3) of the probe (1).

Again, with primary reference to FIGS. 1A through 3C, in particular embodiments, the probe external surface (3) at which the plurality of orifices (2) open can comprise a probe side surface (4) of the probe (1). The probe side surface (4) can be arcuate and in the illustrative examples circumferential; however, this is not intended to preclude embodiments in which the probe side surface (4) can comprise a plurality of flat faces.

Now, with primary reference to FIGS. 3D and 3E, the plurality of orifices (2) open into a plurality of channels (5) internal to the probe (1). In particular embodiments, each the plurality of orifices (2) opens into a different one of the plurality of channels (5) allowing each of the plurality of orifices (2) to lead into only one of the plurality of channels (5). Each of the plurality of channels (5) can comprise a continuous void space delineated by probe internal surfaces (6). Each of the plurality of channels (5) internal to the probe (1) can be fluidly isolated from the other. Thereby, each of the plurality of channels (5) can extend internally in the probe (1) without intersecting.

Again, with primary reference to FIGS. 1A through 3D, the probe external surface (3) can include the probe side surface (4) joining a probe first end (7) opposite a probe second end (8). The plurality of orifices (2) open to the probe side surface (4) can, through the corresponding plurality of channels (5), be fluidically coupled to a plurality of exit orifices (9) open through a probe external surface (3) of the probe (1). In the illustrative example, the external surface of the probe second end (8) can, but need not necessarily, be planar and generally orthogonal with the probe side surface (4). The plurality of exit orifices (9) can open out of the plurality channels (5) of the probe (1) at the probe second end (8). Each of the plurality of exit orifices (9) can open out of a different one of the plurality of channels (5).

Now, with primary reference to FIGS. 3D and 3E, in particular embodiments, each of the plurality of exit orifices (9) can further include a connector (10) which connects one of the plurality of channels (5) associated with an exit orifice (9) to a tubular structure (11). In the connected state, each of the plurality of probe channels (5) can be continuously connected by a connector (10) to its own delineated tubular structure (11). A plurality of tubular structures (11) connected to the probe (1) can be bundled together. As shown in the illustrative examples, a plurality of tubular structures (11) can be bundled by a sheath (12); however, this does not preclude bundling the plurality of tubular structures (11) in a wrap, a band or by an adhesive. As shown in the examples of FIGS. 3D and 3E the tubular structures (11) can, but need not necessarily, be tubes (13) having substantially constant or constant internal cross sectional area between opposite tube ends, and the constant internal cross sectional area between tube ends can be substantially the same or the same as the cross sectional area of the corresponding one of the plurality of channels (5) to which the tube (13) connects. Each of a plurality of tubes (13) connected to the plurality of channels (5) in a probe (1) can have substantially the same or the same structure to correspondingly afford substantially the same or the same tubular structure (11) extending from each of the plurality of probe exit orifices (9).

Now, with primary reference to FIGS. 2A and 2B and 3A through 3C, in particular embodiments, the probe (1) can further include a flange (14) extending outward from the probe side surface (4). In particular embodiments, the probe side surface (4) and the flange (14) can comprise one-piece (as shown in the examples of FIGS. 2A and 2B). In particular embodiments, the flange (14) can be an installable and removable flange (14)(as shown in the example of FIGS. 3A through 3C). A flange coupling structure (15')(15") of the probe (1) couples the flange (14) to the probe side surface (4). A first portion of the flange coupling structure (15') can be coupled to the flange (14) and a second portion of the flange coupling structure (15") can be coupled to the probe side surface (4). The first and second portions of the flange coupling structure (15')(15") can mateably releasably engage the flange (14) to the probe (1). Upon coupling of the flange (14) to the probe side surface (4), the flange (14) extends outward away from the probe side surface (4). In particular embodiments, the flange can extend outward in generally orthogonal relation to the probe side surface (4) to a flange perimeter (16).

Again, with primary reference to FIGS. 3A through 3C, in particular embodiments, an installable and releasable flange (14) can include a flange support portion (17) and flange portion (18). The flange support portion (17) carries the flange portion (18) that extends outward and away from the probe side surface (4). In the illustrative examples, the flange support portion (17) has an outward facing arcuate and circumferential flange support first side surface (19) opposite an inward facing arcuate and circumferential flange support second side surface (20). The flange support portion (17) carries the first portion of the flange coupling structure (15'). The portion of the probe (1) to which the flange (14) releasably connects, the flange carrying probe portion (21), carries the second portion of the flange coupling structure (15"). In an installed orientation the flange support portion (17) overlaps a portion of the probe side surface (4). Further, the flange support portion (17) and the flange portion (18) each extend about and circumscribe the flange carrying probe portion (21) of the probe side wall (4) that releasably connects the flange (14).

Now, with primary reference to FIG. 3B, the flange (14), in an unassembled orientation, can comprise a first flange component (22) detached or separate from a second flange component (23); neither connected to the flange carrying probe portion (21) of the probe (1). Each of the first and second flange components (22)(23) comprise a section of the flange portion (18) and the flange support portion (17). Each of first and second flange component (22) (23) can be semi-circumferential. In an assembled orientation of the flange (14), the first and second flange components (22)(23) cooperate wherein the flange support portion (17) and flange portion (18) each extend about and circumscribe the flange carrying probe portion (21) of the probe side surface (4). In the example depicted, in the assembled orientation shown in FIG. 3C, the first flange component (22) abuts the second flange component (23); however this illustrative example, is not intended to preclude embodiments in which the flange (14) comprises a lesser or greater number of flange components or in which the flange components do not abut or are circumferentially spaced about the probe side surface (4).

Again, with primary reference to FIGS. 1A, 2A, and 3A, in particular embodiments, the probe side surface (4) can comprise a probe first side surface (24) and a probe second side surface (25). Both the probe first and second side surface (24)(25) can be arcuate and circumferential. The probe first side surface (24) delimits a continuous side of a probe pick-up (26) of the probe (1). The plurality of orifices (2) can open through the probe first side surface (24) of the probe pick-up (26). The probe second side surface (25) delimits a continuous side of a probe coupler (27) disposed between a probe coupler base (28) and the probe second end (8). The probe pick-up (26) extends outward from the probe coupler base (28) and away from the probe second end (8) to terminate in the probe first end (7). The probe coupler (27) extends away from the probe pick up (26) to terminate in the probe second end (8). The flange (14) shown in FIGS. 2A and 2B, or the flange portion (18) shown in FIG. 3B can have a flange planar external surface (29) disposed generally flush or flush with the probe coupler base (28).

Figure 4:
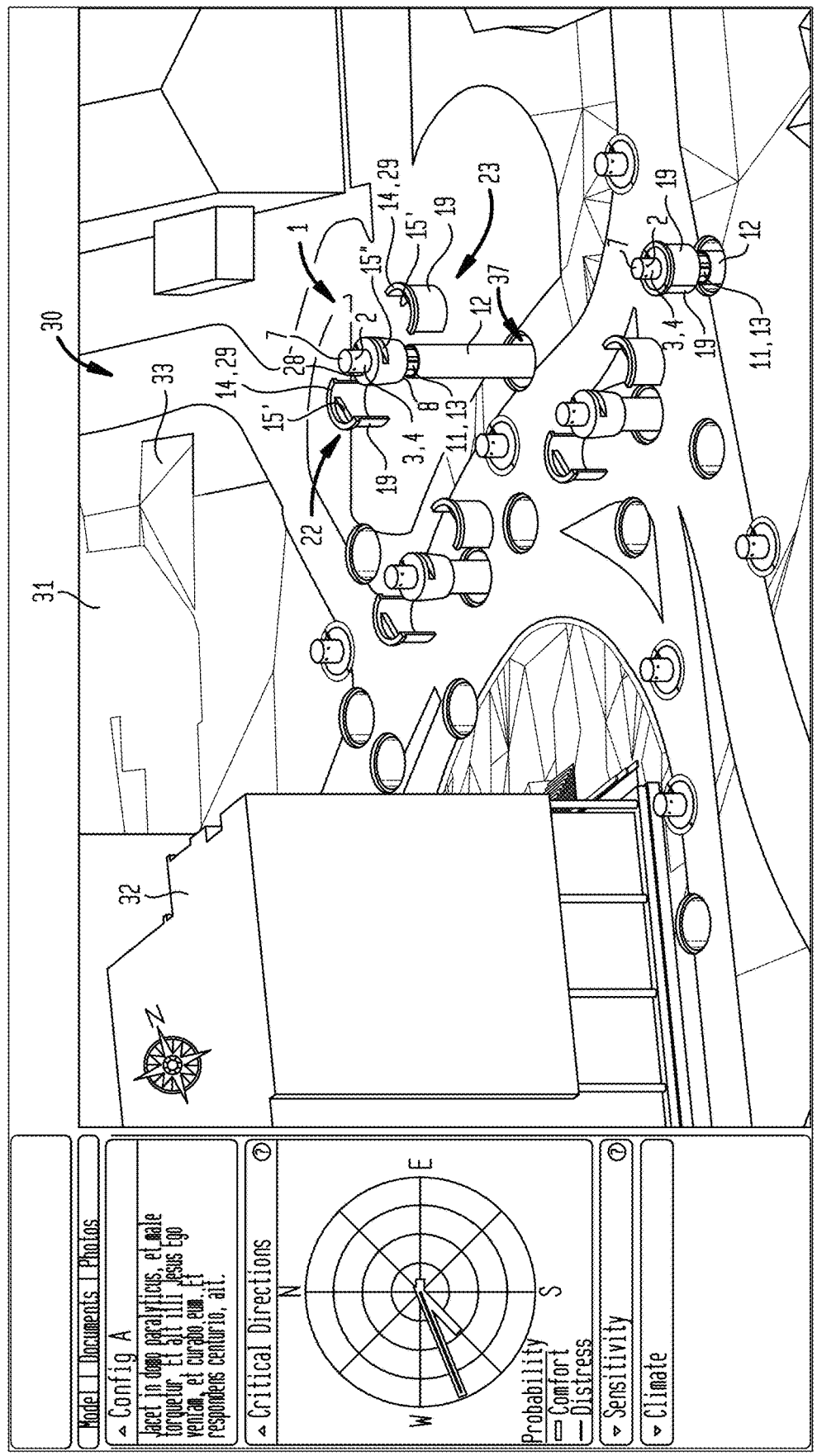
FIG. 4 is an illustration of a method of affixing a plurality of probes in operating orientation in a three-dimensional model.
Figure 5:
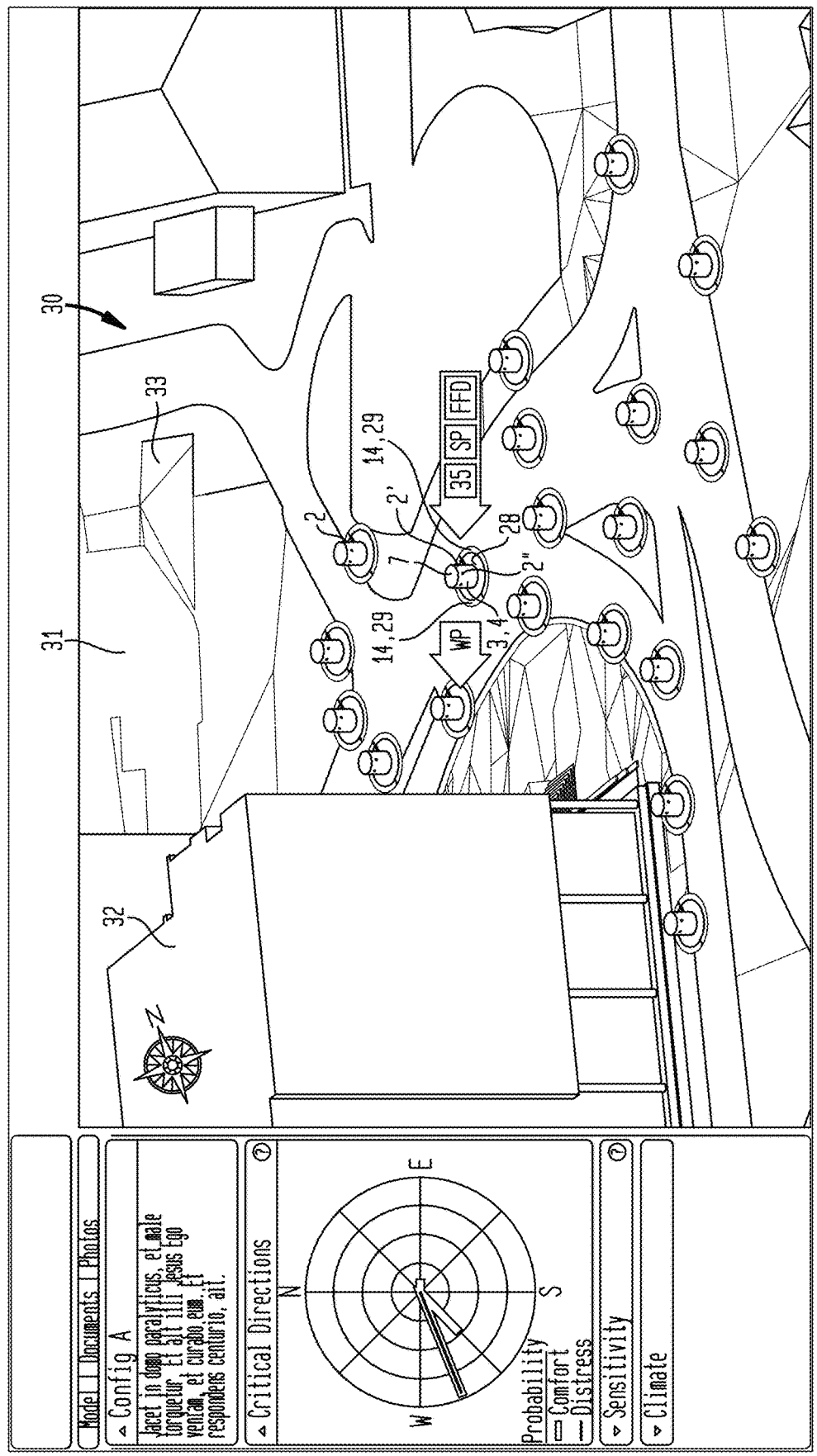
FIG. 5 is an illustration of a plurality of probes affixed in operating orientation in a three-dimensional model.
Figure 6:
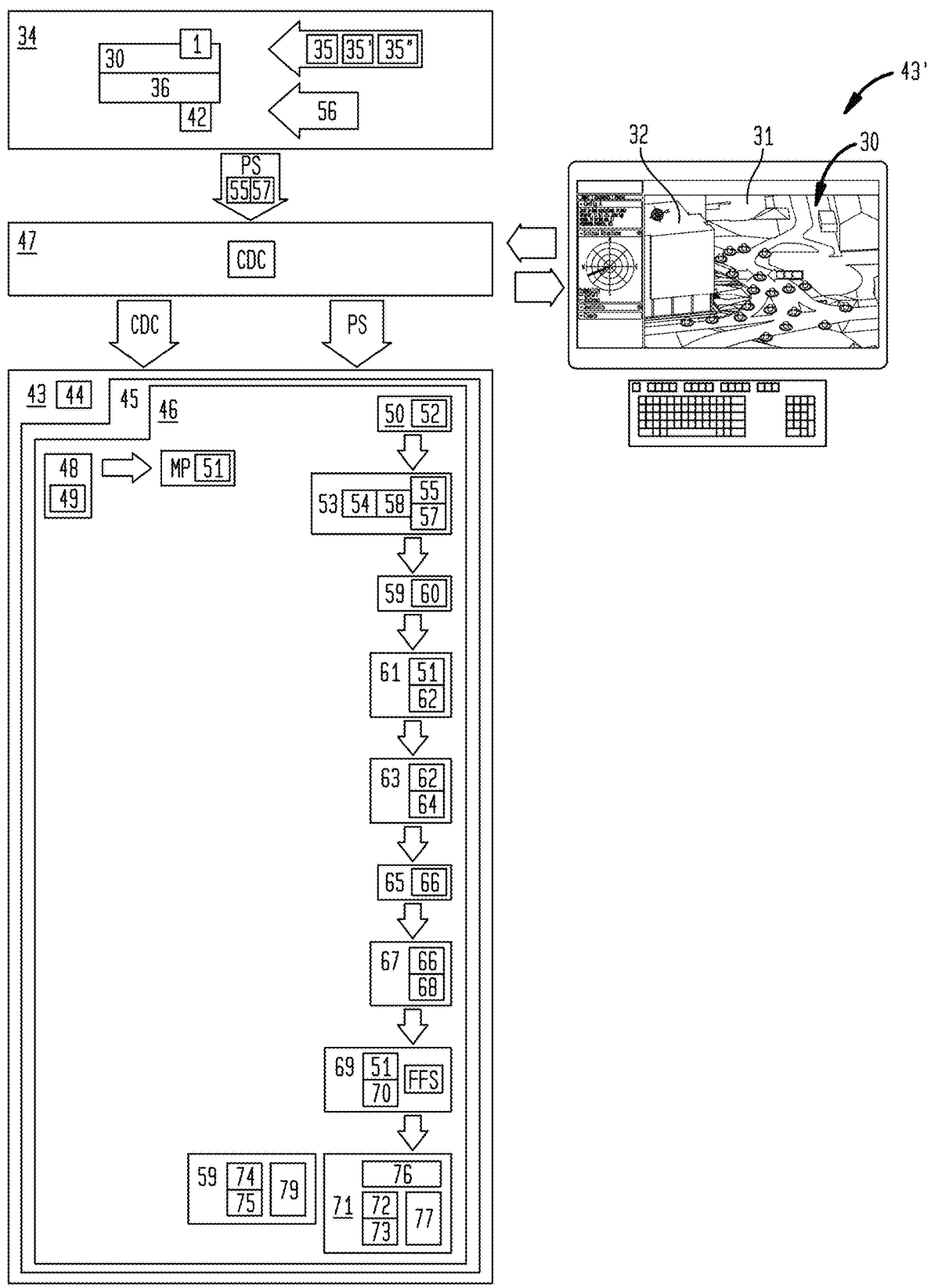
FIG. 6 is a block diagram of a particular embodiment of probe pressure data analysis and graphical display program.

Now, with primary reference to FIGS. 1A and 1B, 2A and 2B, and 3A through 3C, and 4 through 6, the probe (1) can have an operating orientation installed in a physical three-dimensional model (30). In particular embodiments, the three-dimensional model (30) can include the direct environment (31), buildings (32), and other objects (33) modeled at scale to provide a scale three-dimensional model (30) which can be placed in a wind tunnel (34) or other device which generates a fluid flow (35) over the three-dimensional model (30) (as shown in the example of FIG. 6). In particular embodiments, the three-dimensional model (30) can be placed on a turntable (36) to allow the three-dimensional model (30) to be oriented in different orientations to the fluid flow (35) in the wind tunnel (34). In particular embodiments, the three-dimensional model (30) can include a plurality of through bores (37) communicating between a model top surface (38) including one or more of, the direct environment (31), the buildings (32), and other objects (33) and a model bottom surface (39) (as shown in the examples of FIGS. (1A, 2A, 3A). The probe coupler (27) of each of a plurality of probes (1) can be correspondingly fixedly engaged in one of the plurality of through bores (37) in the three-dimensional model (30) with the probe pick-up (26) extending away from model top surface (38) (as shown in the examples of FIGS. 1B, 2B, 3C and 5). In particular embodiments, the flange (14) (whether integral or one-piece to the probe coupler (27) as shown in the example of FIGS. 2A and 2B or releasably connected to the probe coupler (27) as shown in FIGS. 3B and 3C) can be disposed over or abutting the model top surface (38). In particular embodiments, the flange (14) can be seated on the model top surface (38) (as shown in the example of FIG. 2B) or can be seated in a through bore shoulder (40) recessed in the model top surface (38).

Now, with primary reference to FIGS. 1A and 1B, to install the probe, the plurality of tubes (13) can be correspondingly connected to the plurality of exit orifices (9) of the probe (1). The probe can be inserted into an opening of a through bore (37) of the three-dimensional model (30) with the probe pick-up (26) upwardly extending from the model top surface (38). In particular embodiments, the probe (1), disposed in fixed spatial relation within the through bore (37), can dispose the plurality of orifices (2) at about 5 millimeters ("mm") to about 10 mm above the model top surface (38); however, this does not preclude embodiments of the probe pick-up (26) which may extend to a greater or lesser extent from the model top surface (38) to correspondingly dispose the plurality of orifices (2) at a greater or lesser distance from the model top surface (38) depending on the application.

Now, with primary reference to FIGS. 2A and 2B, in particular embodiments, the installation of a probe (1) can further comprise passing one of the plurality of tubes (13) through one of the plurality of through bores (37) in the three-dimensional model (30). The plurality of tubes (13) can be correspondingly connected to the plurality of exit orifices (9) of the probe (1). The probe (1) can be disposed in the through bore (37) seating the outward extending flange (14) of the probe (1) on model top surface (38) of the three-dimensional model (30) to dispose the probe (1) in fixed spatial relation within the through bore (37) with the plurality of orifices (2) at about 5 millimeters ("mm") to about 10 mm above the model top surface (38).

Now, with primary reference to FIGS. 3A through 3C, in particular embodiments, the plurality of tubes (13) can be correspondingly connected to the plurality of exit orifices (9) of the probe (1). The probe (1) connected to the plurality of tubes (13) can be passed through the through bore (37) of the three-dimensional model (30). The installation can further comprise removably installing the flange first and second components (22)(23) to the flange carrying probe portion (21) of the probe (1). Installation can further comprise fixing the flange support first side surface (19) of the first and second components (22)(23) of the probe (1) in fixed spatial relation to the through bore (37) with the plurality of orifices (2) at about 5 millimeters ("mm") to about 10 mm above the model top surface (38).

Now with primary reference to FIGS. 3D, 3E, 5 and 6, in the operating orientation, the probe pick-up (26) communicates with fluid flow (35) over the three-dimensional model (30). The plurality of orifices (2) open to the probe first side surface (24) of the probe pick-up (26) and the respective plurality of channels (5) within the probe (1) capture a dynamic pressure (DP) of the fluid flow (35) at each of the plurality of orifices (2) and transmit the dynamic pressure (DP) through the plurality of channels (5) and the corresponding connected tubular structures (11) defining a dynamic pressure pathway (41) to a pressure sensor (42). In particular embodiments, each one of the plurality of channels (4) can be fluidically connected to one pressure sensor (42) with a further corresponding channel delineated by the tubular structure (11) or tube (13); the tubular structure (11) continuously extends each of the plurality of channels (5) into a connected orientation to one pressure sensor (42), pressure transducer, or pressure transmitter (collectively referred to as a "pressure sensor"), thereby, each of the plurality of channels (5) can be in fluid connection with a dynamic pressure pathway (41) of one of a plurality of pressure sensors (42). The dynamic pressure pathway (41) includes a pathway of a pressure sensor (42). A wide variety of pressure sensors (42) can be suitable for use with embodiments including as illustrative examples a capacitance pressure transducer, a strain gauge, a resonant wire transducer; however, this is not intended to preclude other pressure measurement devices such as: a piezoresistive strain gauge, a piezoresistive silicon pressure sensor, or other pressure measurement devices selected based on the application. A pressure transducer suitable for use in embodiments of the invention can be PN: D1-4V-MINI available from an AllSensors, 16035 Vineyard Boulevard, Morgan Hill, CA 95037.

Now, with primary reference to FIG. 5, in particular embodiments, the dynamic pressure pathway (41) can be fluidically connected to the pressure measurement side of a sensing surface of the pressure sensor (42) and the reference pressure side of the sensing surface of the pressure sensor (42) can be fluidically connected to ambient atmospheric pressure (AP). Dynamic pressure (DP), the kinetic energy per unit volume of the fluid flow over the three-dimensional model (30), applied at each of the plurality of orifices (2) on the probe pick-up (26) by the fluid flow (35) over the three-dimensional model (30) can be conducted through a corresponding dynamic pressure pathway (41) to the pressure measurement side of the sensing surface of the corresponding pressure sensor (42) while ambient atmospheric pressure (AP) can be concurrently conducted to the reference pressure side of the sensing surface of the pressure sensor (42). Each pressure sensor (42) generates a pressure sensor signal (PS) (typically output voltage) that varies based on the difference between the dynamic pressure (DP) and the ambient atmospheric pressure (AP) applied to the corresponding pressure measurement side and pressure reference side of the pressure sensor (42).

Now, with primary reference to FIG. 6, embodiments of the invention can further include a computing device (43) including a processor (44) communicatively coupled to a non-transitory computer readable media (45) containing computer executable instructions which implement a data analysis and graphical display program (46) (also referred to as the "computer program"). In particular embodiments, the computer program (46) can be accessed, or downloaded in whole or in part, to one or more client computing devices (43') via a network (47) to correspondingly confer user interactive functionalities in and to the client computing device (43') to provide client computing device content (CDC), as illustrative examples: Internet documents, graphics, audio, and video files, voice communication, electronic mail, instant messages. The client computing device (43) can as illustrative examples be: a desktop computer device, a mobile computing device, such as, personal computers, slate computers, tablet or pad computers, cellular telephones, smartphones, programmable consumer electronics, or combinations thereof. While embodiments of the computer program (46) are described in the general context of computer-executable instructions such as program modules which utilize routines, programs, objects, components, data structures, or the like, to perform particular functions or tasks or implement particular abstract data types, it is not intended that any embodiments be limited to a particular set of computer-executable instructions or protocols.

Again, with primary reference to FIG. 6, in particular embodiments, the computer program (46) can include a pressure calculator (48) operable to convert the pressure sensor signal (PS) associated with the dynamic pressure (DP) applied to each of the plurality of orifices (2) on the probe pick-up (26) to measured pressure (MP) by applying a pressure sensor signal to pressure conversion algorithm (49) typically supplied by the manufacturer of the pressure sensor (42) or determined empirically by use. The computer program (46) can further include a pressure sensor signal frequency spectrum generator (50) which assembles and converts a time series of pressure data points indexed in time order, typically at successive equally spaced points in time (also referred to as "pressure time series data (51)") to the frequency domain which shows how variations in the pressure sensor signal (PS) are distributed over a range of frequencies (also referred to as a "spectrum (52)").

The dynamic pressure (DP) can be attenuated along the dynamic pressure pathway (41) between an orifice (2) on the probe pick-up (26) and the pressure sensor (42). The computer program (46) can further include an attenuation loss compensator (53) which multiplies each frequency in a spectrum (52) by a transfer function (54) to compensate for the corresponding attenuation of the pressure sensor signal (PS). The transfer function (54) for each dynamic pressure pathway (41) can be determined by establishing a standard pressure signal (55) for each frequency in the spectrum (52) by applying a white noise signal (56) directly to the pressure measurement side of the pressure sensor (42) and establishing an attenuated pressure signal (57) for each frequency in the spectrum (52) by conducting the same white noise signal (56) through the dynamic pressure pathway (41) to the pressure measurement side of the pressure sensor (42). The spectrum (52) of the attenuated pressure sensor signal (57) can be compared to the spectrum (52) standard pressure signal (55) to determine the compensation factor (58) for each frequency in the spectrum which collectively can be applied as the transfer function (54) to the pressure sensor signal (PS) by the attenuation loss compensator (53) to compensate for the attenuation of the pressure sensor signal (PS) through each dynamic pressure pathway (41).

Again, with primary reference to FIGS. 5 and 6, embodiments of the computer program (46) can further include a fluid flow direction analyzer (59) operable to determine the fluid flow direction (FFD) in relation to the probe pick-up (26) disposed in the operating orientation in the three-dimensional model (30). The FFD comprises the location on the probe pick-up (26) receiving the highest dynamic pressure (DP) also referred to as the stagnation pressure (SP) (as shown in the example of FIG. 3E). The dynamic pressure (DP) at the location on the probe pick-up (26) opposite the location on the probe pick-up (26) of the stagnation pressure (SP) comprises the wake pressure (WP) (as shown in the example of FIG. 3E). The net pressure (NP) comprises the difference between the stagnation pressure (SP) and the wake pressure (WP).

Now, with primary reference to FIG. 7, a plot of a control pressure pattern (60) around the probe pick-up (26) can be generated by applying a control fluid flow (35') generally orthogonal to the probe pick-up (26) (as shown in the example of FIG. 6) disposed in the installed orientation in a flat surface and rotating the probe pick-up (26) about the probe pick-up longitudinal axis (PUA) through 360 degrees while concurrently obtaining measured pressure (MP) associated with the dynamic pressure (DP) at one orifice (2) of the probe pick-up (26). The plot of the control pressure pattern (60) depicts the stagnation pressure (SP) located at about 0 degrees of rotation with the plot of the control pressure pattern (60) depicting a reduction in measured pressure (MP) approaching 70 degrees of rotation with the wake pressure (WP) occurring between about 100 degrees of rotation and about 260 degrees of rotation and an increase of measured pressured (MP) approaching the stagnation pressure (SP) at about 360 degrees rotation.

Now, with primary reference to FIG. 8, in the illustrative example of a probe pick-up (26) having six orifices (2) equidistantly spaced about the circumference of the probe pick-up (26), the measured pressure (MP) of the dynamic pressure (DP) of an experimental fluid flow (35") can be determined for each of the six orifices (2) and the measured pressure (MP) at each of the six orifices (2) can be superimposed on the plot of the control pressure pattern (60).

As shown in the illustrative example of FIG. 8, when the stagnation pressure (SP) has a location in relation to the probe pick-up (26) which coincides or substantially coincides with the location of one of the six orifices (2) on the probe pick-up (26), then the measured pressure (MP) will be the dominant measured pressure (MP') by comparison with the measured pressure (MP) at the other five orifices (2). In that instance, the stagnation pressure (SP) and the corresponding fluid flow direction (FFD) will be determined by the fluid flow direction analyzer (59) to be directly upwind of that one orifice (2) having the dominant measured pressure (MP') on the probe pick-up (26).

As shown in the illustrative example of FIG. 9, when the stagnation pressure (SP) has a location on the probe pick-up (26) exactly between two adjacent orifices (2')(2") on the probe pick-up (26) the measured pressure (MP) at the two orifices (2')(2") will both be the greatest positive measured pressures (MP''') and the stagnation pressure (SP) will be at a location on the probe pick-up (26) between the two adjacent orifices (2) on the probe pick-up (26). In the embodiment having six orifices (2), the fluid flow direction (FFD) can be determined by the fluid flow direction analyzer (59) by applying the arctangent of the ratio of the two greatest positive measured pressures (MP) at two adjacent orifices (2')(2") expressed as a fraction of the 60-degree angle between the two orifices (2')(2"). In embodiments having greater or lesser number of orifices (2), the arctangent of the ratio of the two greatest positive measured pressures (MP) at two adjacent orifices (2')(2") can be expressed as a fraction of the degree angle between the two orifices (2')(2").

Now, with primary reference to FIGS. 6, 8 and 9, with the wind direction determined by the fluid flow direction analyzer (59), each of the measured pressures (MP) (six measured pressures in the illustrative example) can be superimposed on or compared to the plot of the control pressure pattern (60) (as shown in the examples of FIGS. 8 and 9). In particular embodiments, a standard deviation calculator (61) can calculate the standard deviation (62) of each time series pressure data points (51) of the six measured pressures (MP) from the expected control pressure pattern (60). By operation of a standard deviation comparator (63), if the standard deviation (62) exceeds a pre-selected standard deviation threshold (64), the standard deviation comparator (63) removes the corresponding time period from series of pressure data points (51). A standard deviation (62) in excess of the pre-selected standard deviation threshold (64), can be attributable to various causes, as illustrative examples, a very low wind speed associated with a correspondingly low signal-to-noise ratio, very high turbulence about the probe pick-up (26) causing an aberrant pressure pattern, or the presence of the direct environment (31), buildings (32), or other objects (33) close to the probe pick-up (26). With the time periods of the series of pressure data points (51) which are in excess of the pre-selected standard deviation threshold (64) removed, a net pressure calculator (65) can calculate the measured net pressure (66) by subtraction of the wake pressure (WP) from the stagnation pressure (SP). By operation of a net pressure deviation comparator (67), any measured net pressures (66) in the time series of pressure data points (51) that occur below a pre-selected a net pressure threshold (68) can be removed. In the illustrative example, any measured net pressure (66) determined to be below the pre-selected net pressure threshold (68) of 2.5 Pascal (Pa) were removed. The pre-selected net pressure threshold (68) can be determined based on an acceptable level of signal to noise ratio in a particular application.

Now, with primary reference to FIG. 6, particular embodiments can further include a fluid flow speed calculator (69). From Bernoulli's equation, the relationship between wind speed (U) and pressure (P) is proportional to:

$$P = \tfrac{1}{2} \rho U^2 a$$

where ρ is fluid density, and a is a constant calibration factor. This can be rearranged to calculate fluid flow speed (FFS) from a measured pressure (MP), as:

$$U = \sqrt{\frac{2P}{\rho a}}$$

The fluid flow speed calculator (69) can operate to convert the pressure time series data (51) to the corresponding fluid flow speed time series data (70) and fluid flow speed (FFS). In particular embodiments, a fluid flow speed analyzer (71) and the fluid flow direction analyzer (59) can analyze the respective fluid flow speed time series data (70) and the pressure time series data (51) to determine the mean fluid flow speed (72) and standard deviation of fluid flow speed (73) and the mean fluid flow pressure (74) and the standard deviation of the fluid flow pressure (75) which can be converted to mean fluid flow direction (77) and standard deviation of fluid flow direction (79).

Now, with primary reference to FIGS. 10 through 11, the probe (2) disposed in the probe (2) operating orientation in the three-dimensional model (30) including the actual or proposed direct environment (31), buildings (32), or other objects (33) can be used to obtain the determined pressure time series data (51) plotted against fluid flow direction time series data (76) as a scatter plot (81) which allows visual access to the directional scatter (82) of the pressure time series data points (51) to understand the local fluid flow (35) behavior as altered by actual or prospective direct environment (31), buildings (32), or other objects (33) (pressure time series datapoints depicted in FIGS. 10 and 11 as orange and blue pressure time series datapoints, the blue time series datapoints indicating pressure data points removed as being below a pre-selected pressure threshold). With respect to the example of FIG. 10, the actual or prospective direct environment (31), buildings (32), or other objects (33) disposed in the three-dimensional model (30) generate relatively low directional scatter of the fluid flow (35) across the three-dimensional model (30). By comparison the example of FIG. 11 depicts relatively high directional scatter due to the direct environment (31), buildings (32) or other objects (33) disposed in the three-dimensional model (30).

Now, with primary reference to FIG. 12, a method of determining fluid flow direction (FFD) and fluid flow speed (FFS) of fluid flow (35) can include obtaining a probe (1) having a plurality of orifices (2) disposed in a probe side surface (4) (Block S1) and fluidically connecting each the plurality of orifices (2) disposed in the probe side surface (4) to a pressure sensor (42) via a dynamic pressure pathway (41) defined by a plurality of channels (5) extending from each orifice (2) within the probe (1) to a tubular structure (11) connecting each of the plurality of channels (5) to a corresponding pressure sensor (42) (Block S2). The method can further include disposing the probe (1) in operating orientation in a three-dimensional model (10) having the plurality of orifices (2) disposed above the model top surface (38) (Block S3) and disposing the three dimensional model (30) in a fluid flow (35) generated in a wind tunnel (34) (Block S4). The method can further include communicatively coupling the pressure sensor signal (PS) from each pressure sensor (42) to a computing device (43) including data analysis program (46) (Block S5). The method can further include collecting pressure time series data (51) based on the dynamic pressure (DP) applied to each of the plurality of orifices (2) open on the probe side surface (4) of the probe pick-up (26) (Block S6). The method can further include compensating pressure time series data (51) for attenuated pressure signal (52) with a transfer function (54) applied by an attenuation loss compensator (53) of the data analysis program (46) (Block S7). The method can further include determining fluid flow direction (FFD) relative to the probe pick-up (26) by comparison of measured pressure (MP) of the dynamic pressure (DP) at each of the plurality of orifices (2) to a plot of the control pressure pattern (60) of the probe (2) by operation of a fluid flow direction analyzer (59) of the data analysis program (46) (Block S8). The method can further include removing pressure time series data (51) that exceeds a pre-selected standard deviation threshold (64) by operation of a standard deviation calculator (61) and a standard deviation comparator of the data analysis program (46) (Bock S9). The method can further include calculating measured net pressure (66) by operation of a net pressure calculator (65) of the data analysis program (46) (Block S10). The method can further include removing pressure time series data (51) having a net pressure (66) occurs below a pre-selected net pressure threshold (68) by operation of a net pressure deviation comparator (67) (Block S11). The method can further include calculating air flow speed time series data (70) by operation of a fluid flow speed calculator (69) (Block S12). The method can further analyze air flow direction time series data (76) and fluid flow speed time series (70) (Block S13). The method can further include generating output data (80) including one or more of mean airflow direction (77), standard deviation of fluid flow direction (79), plots of pressure time series data (51) against fluid flow direction time series data (76), mean fluid flow speed (72), standard deviation of fluid flow speed (73), percent below pre-selected net pressure threshold (68), and percent above a pre-selected standard deviation pressure threshold (64) (Block S14).

As can be easily understood from the foregoing, the basic concepts of the present invention may be embodied in a variety of ways. The invention involves numerous and varied embodiments of probe (2) adapted to be positioned in a scale three-dimensional model (30) and methods for making and using such probe to measure fluid flow pressure (MP) and measured fluid flow speed (FFS) and fluid flow direction.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "sensor" should be understood to encompass disclosure of the act of "sensing"—whether explicitly discussed or not—and, conversely, were there effectively disclosure of the act of "sensing", such a disclosure should be understood to encompass disclosure of a "protrusion" and even a "means for sensing". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the probes herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A probe, comprising:
   a probe pick-up having a plurality of entry orifices;
   a probe coupler having a probe coupler side surface disposed between a probe coupler first end opposite a probe coupler second end, said probe second end having a plurality of exit orifices,
   said probe coupler having a greater diameter than said probe pick-up, said probe pickup outwardly extends from said probe coupler first end and away from said probe second end;
a plurality of channels in said probe fluidically couple said plurality of entry orifices with said plurality of exit orifices on said probe second end,
said probe coupler including:
a first semi-circumferential flange component;
a second semi-circumferential flange component,
said first semi-circumferential flange component and said second semi-circumferential flange component each comprise a flange portion carried by a flange support portion,
said flange support portion including a coupling structure first portion which releasably mates with a coupling structure second portion disposed on said probe coupler side surface,
said first semi-circumferential flange component and said second semi-circumferential flange component releasably mated to said probe coupler side surface disposes said a flange portion outwardly extending from and circumferentially around said probe coupler side surface,
said probe coupler configured to install in a through bore open between a model top surface and a model bottom surface of a physical three-dimensional model with said plurality of entry orifices of said probe pick-up dispose a distance above said physical three-dimensional model top surface of said geographic environment.

2. The probe of claim 1, wherein each of said plurality of channels comprise a continuous void space.

3. The probe of claim 2, wherein each of said plurality of channels fluidically couples only one of said plurality of entry orifices open on said probe side surface with only one of said plurality of exit orifices open on said probe second end.

4. The probe of claim 1, A probe, comprising:
wherein said plurality of entry orifices disposed on said probe side surface include an integer number of entry orifices selected from the group consisting of: five, six, seven, eight, nine, and ten.

5. The probe of claim 1, wherein said flange extends generally orthogonally to said probe coupler side surface.

6. The probe of claim 1, further comprising
a plurality of tubular structures, wherein only one of said plurality of tubular structures correspondingly couples to one of said plurality of channels in said probe.

7. The probe of claim 6, further comprising a plurality of pressure sensors, each of said plurality of pressure sensors connect to one of said plurality of tubular structures.

8. The probe of claim 7, further comprising dynamic fluid pressure path between each of said plurality of entry orifices open on said probe side surface and each of said plurality of pressure sensors defined by said plurality of channels and said plurality of tubular structures.

9. The probe of claim 1, wherein each of said plurality of pressure sensors generates pressure sensor signals analyzed to determine fluid flow direction and fluid flow speed of a fluid flow about the probe pick-up.

* * * * *